United States Patent [19]

Plummer

[11] Patent Number: 4,689,184

[45] Date of Patent: Aug. 25, 1987

[54] METHOD FOR FORMING AN OPTICAL CONNECTOR

[75] Inventor: William T. Plummer, Concord, Mass.

[73] Assignee: Polaroid Corporation, Cambridge, Mass.

[21] Appl. No.: 551,348

[22] Filed: Nov. 14, 1983

Related U.S. Application Data

[62] Division of Ser. No. 438,586, Nov. 2, 1982, Pat. No. 4,531,702.

[51] Int. Cl.⁴ .................. B29D 11/00; B29C 33/20
[52] U.S. Cl. .................. 264/1.5; 249/161; 264/328.9; 425/589
[58] Field of Search ............... 350/96.20, 96.21; 425/808, 416, 423, DIG. 5, DIG. 35, DIG. 221; 264/1.5, 328.1, 328.9; 249/142, 160, 161, 162

[56] References Cited

U.S. PATENT DOCUMENTS

| | | | |
|---|---|---|---|
| 2,261,916 | 11/1941 | Megow et al. | 18/59 |
| 3,081,494 | 3/1963 | Darnell | 249/160 |
| 3,375,554 | 4/1968 | Blumer | 249/142 |
| 3,647,337 | 3/1972 | Dega | 249/121 |
| 3,837,612 | 9/1974 | Detert | 249/142 |
| 3,888,568 | 6/1975 | Norris et al. | 350/252 |
| 3,942,755 | 3/1976 | Robinson | 249/162 |
| 3,944,328 | 3/1976 | Kent et al. | 350/96 C |
| 4,008,031 | 2/1977 | Weber | 425/242 R |
| 4,012,215 | 3/1977 | Schwab et al. | 65/66 |
| 4,107,242 | 8/1978 | Runge | 264/1 |
| 4,173,389 | 11/1979 | Curtis | 350/96.20 |
| 4,254,065 | 3/1981 | Ratkowski | 264/2.5 |
| 4,327,964 | 5/1982 | Haesly et al. | 350/96.20 |
| 4,383,819 | 5/1983 | Letica | 249/160 |
| 4,402,659 | 9/1983 | Greenbaum | 425/416 |
| 4,410,469 | 10/1983 | Katagiri | 264/272.17 |

FOREIGN PATENT DOCUMENTS 1127069 4/1962 Fed. Rep. of Germany ... 425/DIG. 221
56-155911 12/1981 Japan .

Primary Examiner—James Lowe
Attorney, Agent, or Firm—Francis J. Caufield

[57] ABSTRACT

A method and apparatus for forming miniaturized optical components such as fiber optics connector terminals in which a three-part mold set is employed to attain precise concentricity of mold cavity formations carried by two of the three mold parts which are movable axially relative to and positioned by the third or central one of the three parts. The two movable parts are each located by oppositely diverging frustoconical reference surfaces on the central part and include mold surface components which are axially positionable relative to the parts in which they are carried. The central part is supported by a shuttle for movement between a molding position and an ejection position, appropriate ejection pins being located in spaced relation to the molding position so as not to interfere with the molding operation. Precise concentricity and axial location of the three mold parts is effected in substantial measure by application of a mold closing force exclusively along the common axis of the three parts and under a force limited to a pre-established value.

3 Claims, 11 Drawing Figures

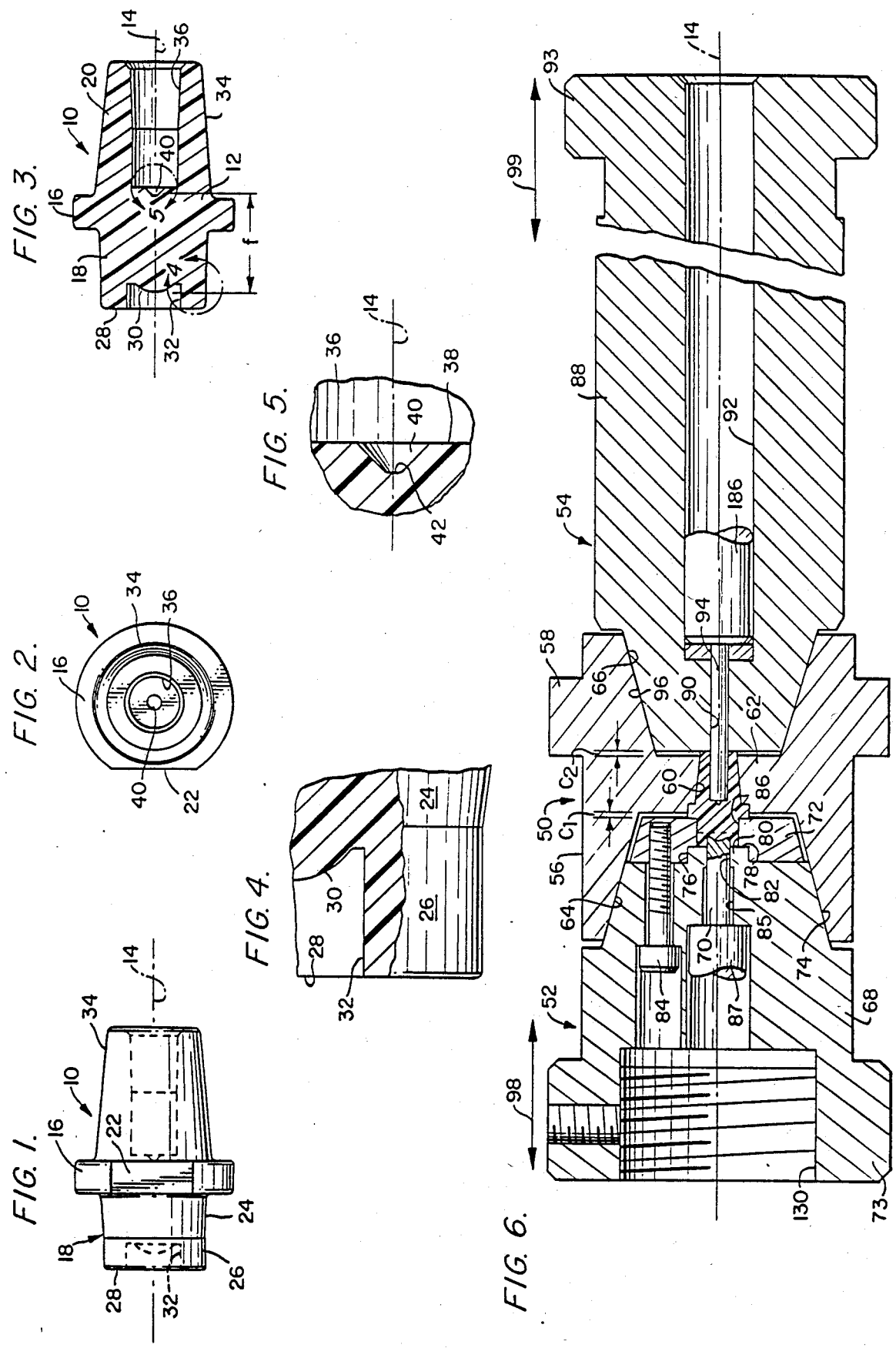

METHOD FOR FORMING AN OPTICAL CONNECTOR

This is a division of application Ser. No. 438,586 filed Nov. 2, 1982, now Pat. No. 4,531,702.

BACKGROUND OF THE INVENTION

This invention relates to plastic injection molding and, more particularly, to precision molding methods and apparatus for forming miniature optical components for use in optical fiber connectors, for example.

The effectiveness of optical fibers for transmitting information by light is now well known and the basis for increased commercial application of fiber optics systems. As such systems evolve, however, the need for improved, low-cost fittings, such as connectors for coupling optical fiber segments, becomes increasingly apparent. In spite of the apparent need, the extremely small diameters of the fiber cores used (on the order of 50 microns or 0.002 inches) and propensity for light loss at any discontinuity in the refractive index of the light path have severely curtailed the attainment of a low-cost optical fiber connector which is capable of performance in a manner consistent with the light transmitting efficiency of a continuous optical fiber.

Fiber optics connectors heretofore disclosed have generally involved precision molding or otherwise forming an enlarged plastic or metal terminal component at or near the end of each of two fibers to be connected, taking great care to achieve seating surfaces on the terminal components which are concentric with the fiber axis. Two such terminals may then be joined mechanically to retain the connected fibers in precise alignment with each other. While such connectors may be considered releasable or reconnectable in the manner of an electrical coupling, the need for a liquid or plastic having the same refractive index as the fibers to effect continuity of light transmission through the connection has tended to a class of connectors more truly characterized as a quasi-permanent splice than a releasable connector. Exemplary disclosures of such connectors are found in U.S. Pat. Nos. 3,999,841; 4,087,158; 4,107,242; and 4,173,389.

To avoid the problems associated with a connector design in which the two optical fibers are, in effect, retained in end-to-end abutment for direct transfer of light from one fiber to the other, it has been proposed to use a preformed fiber terminal mountable over the end of each fiber in a manner to be self-centering and incorporating a collimating lens by which a beam emerging from one fiber end is enlarged and refocused into the other fiber end. Thus, arranging the lens of one such terminal in facing axial relationship to the lens of another such terminal effects a transfer of information from one fiber to the other by way of an enlarged collimated beam which is subsequently reduced for transfer to the second optical fiber. The preformed terminal is not only easily applied concentrically to the end of each fiber, but the transfer by way of an enlarged beam contributes to higher light-transmitting efficiencies due to the greater range of dimensional tolerances permitted in the mechanical components for releasably retaining the two terminals in operative relationship. Additionally, the conversion of the fiber optic transmitted light signals to an enlarged beam at the juncture of the two fibers permits use of beamsplitters and the like for monitoring or otherwise tapping the information represented by the transmitted light.

Although in theory, this latter class of fiber optic connectors represents an exciting advance in the field of fiber optics, practical application has been disappointing largely due to an inability to meet required mechanical and optical tolerances. In a molded plastic terminal component having overall exterior dimensions of less than $\frac{1}{4}$ inch in diameter and approximately $\frac{3}{8}$ inch in length, for example, a seating surface for an optical fiber having a composite outside diameter of approximately 0.005 inches must be concentric on the axis of an aspheric lens within 0.000020 inches; the lens must be focused precisely at the end of the seated optical fiber and the lens must be capable of alignment with a similar lens to 0.5 minutes of arc. The maintaining of such tolerances by injection molding of plastic materials presents a major challenge which heretofore has not been met.

SUMMARY OF THE INVENTION

In accordance with the present invention, a method and apparatus is provided for injection molding of parts, represented by fiber optics connector terminals, with optical precision at all critical surfaces by employing a three-part mold in which a central receiver part functions as the sole means for locating a pair of end forming assemblies to which mold closing pressure is applied exclusively by axial components of force. The receiver is formed with oppositely diverging frustoconical reference surfaces which locate the end forming assemblies both in precise concentricity relative to each other and in precise axial relationship. Relative axial relationship of the end forming assemblies is further assured by a pre-established and limited mold closing force.

The invention is particularly, though not exclusively, suited for injection molding of fiber optics connector terminals in which an aspheric collimating lens surface is oriented with optical precision relative to physical locating surface formations including an optical fiber positioning socket capable of guiding the end of a single optical fiber into precise concentricity with and precisely at the focal point of the aspheric collimating lens. Other critical surfaces on the connector terminal include a lens end face which must be precisely perpendicular to the axis of the lens and a cylindrical locating surface by which the lens and terminal may be aligned mechanically with another such terminal or device to or from which information is transmitted by light. All critically precise surfaces of the part are defined by molding die surfaces carried by the outboard two of the three lens parts. Though functioning as units, the outboard mold parts are in fact assemblies in which critical mold cavity surfaces are removably or adjustably carried by a body having a precision machined frustoconical locating surface to cooperate with the respective frustoconical reference surfaces of the central part or receiver. In this way, the two end forming assemblies and the receiver may be provided as precision calibrated sets.

The application of an exclusively axial closing force on the movable end forming mold parts is achieved by supporting these parts with a measure of radial freedom in movable frames and confining the application of closing force to the parts per se to that transmitted through a spherical ball. The maximum closing force to be applied is limited by a Belleville washer set acting on each of the spherical balls.

An added measure of accuracy in the formed part is attainable by the avoidance of ejector pin components in the mold cavity defining the part. This advantage is achieved by mounting the central or receiver mold part in a shuttle movable in a direction perpendicular to the molding axis between a molding position and an ejection position. In this way, the formed parts may be ejected from the central mold cavity by ejector pins spaced from the region of the mold cavity.

A primary object of the present invention is to provide a precision molding method and apparatus capable of reliably forming miniaturized optical components represented by a connector terminal for a single optical fiber approximating 50 microns in diameter.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 1 is an enlarged side elevation of a fiber optic connector terminal to be formed in accordance with the present invention;

FIG. 2 is an end view of the connector illustrated in FIG. 1;

FIG. 3 is a longitudinal cross section of the terminal illustrated in FIG. 1;

FIG. 4 is an enlarged fragmentary cross section corresponding to the area within the sight circle 4 of FIG. 3;

FIG. 5 is an enlarged fragmentary cross section corresponding to the area within the sight circle 5 of FIG. 3.

FIG. 6 is a longitudinal cross section illustrating basic molding components of the present invention;

DETAILED DESCRIPTION OF THE MOLDED PART

Figure 8:
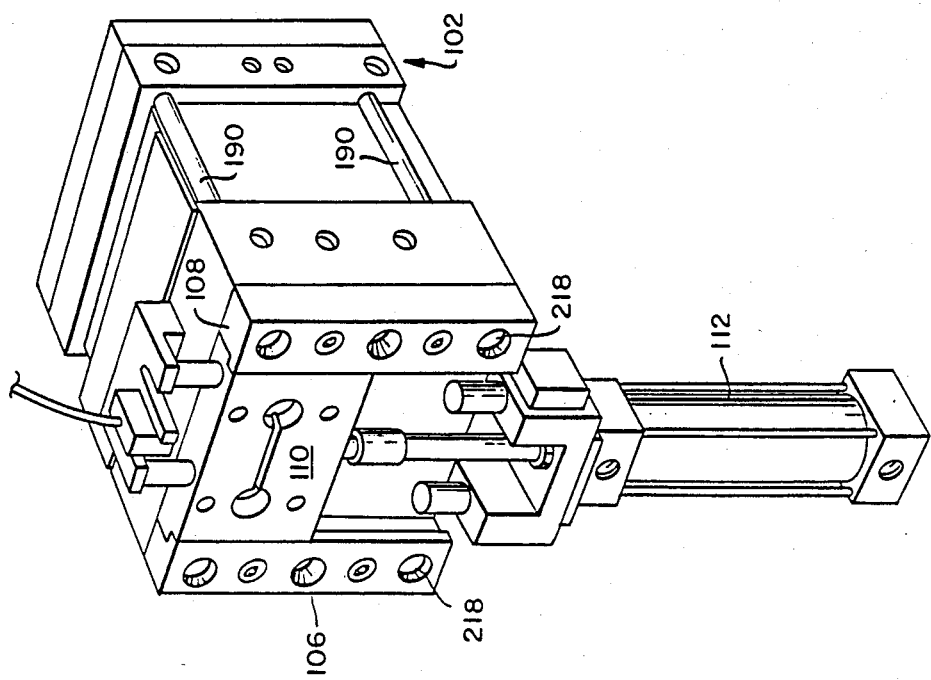
FIG. 8 is a similar perspective illustration illustrating part of the apparatus in a different operational condition.

In FIGS. 1-5 of the drawings, a fiber optics lens terminal to be formed in accordance with the present invention is generally designated by the reference numeral 10 and shown as a unitary body 12 of light transmitting plastic material generally concentric throughout the length thereof with a central axis 14. An exterior flange 16 near the longitudinal center of the body 12 may be characterized as dividing the body into a lens portion 18 and a fiber receiving or ferrule portion 20. The periphery of the flange 16, as shown in FIGS. 1 and 2, is circular with the exception of a flat 22 on one side thereof.

The exterior of the lens portion 18 is formed as a tapered section 24 extending from the flange 16 to a cylindrical end section 26 having a radial end face 28. A convex aspheric lens surface 30, precisely concentric with the axis 14, is located the base of a cylindrical bore 32 opening through the radial end face 28. The focal length of the lens is designated by the dimension f in FIG. 3.

The ferrule portion 20 is defined by a tapered exterior surface 34 and a generally cylindrical, open-ended fiber receiving socket 36. The internal end or bottom of the socket 36 is shown most clearly in FIG. 5 to include an annular floor surface 38 in which a frustoconical recess 40 is formed. The recess 40 is precisely centered on the axis 14 and tapers to a circular bottom 42 of a diameter smaller than the outside diameter of an optical fiber (not shown) to be received in the socket 36. In practice, the diameter of the recess floor 42 will approximate 0.0030-0050 inches to accommodate a single optical fiber (not shown) having a core size approximating 50 microns or 0.002 inches and an outside diameter of cladding ranging from about 0.003 inches up to 0.005 inches. The recess 40 is dimensioned so that the end of the fiber to be received therein does not touch the bottom 42 of the recess.

In use, one of two optical fibers to be joined or connected is inserted into the recess 36 and the end thereof guided to a position of precise concentricity with the axis 14 by the frustoconical recess 40. The fiber is retained permanently in the ferrule by an appropriate mastic or filler having an index of refraction preferably substantially identical to that of the optical fiber and of the plastic from which the body 12 is formed. When so received in the socket 36, the end of the fiber will be located precisely at the focal point of the lens 30 so that light emanating from the end of the fiber positioned in the ferrule 20 will be presented as an enlarged collimated image on exiting from the lens surface 30. By arranging two such terminals 10 with the radial end faces 28 thereof in abutting relationship and retained mechanically in precise concentricity on the axis 14, light information from one fiber is enlarged, transmitted to a second lens (not shown) and focused into the second optical fiber.

In light of the foregoing, it will be appreciated that certain dimensional relationships in the molded connector terminal are critical. For example, it is important that the fiber locating frustoconical recess 40 and the lens 30 be concentric with each other and the axis 14 within 0.000020 inches. Similar tolerances are required in the formation of the end surface or end face 28 and of the cylindrical end section 26. It is important that the end face 28 be precisely perpendicular with the axis 14 so that the respective end faces 28 of two such terminals are in abutment with each other and not tilted. Precision in the end section 26 of the lens portion 24 is important to enable mechanical retention of two such connector terminals in precise concentric alignment with each other.

DETAILED DESCRIPTION OF THE PREFERRED EMBODIMENT

Molding die components of the present invention for shaping the terminal 10 by injection molding of appropriate plastic materials are shown most clearly in FIG. 6 of the drawings. Generally, such components include a first mold part or "receiver" 50, a second mold part or "lens form" assembly 52 and a third mold part or "socket form" assembly 54. Although the manner and means for supporting and otherwise using these three mold parts will be described in more detail below, the illustration in FIG. 6 will facilitate an understanding of mold cavity surfaces having a direct correlation to the terminal 10 to be formed as well as an understanding of structure defining such surfaces.

The receiver 50 is in the nature of an annular body having a generally cylindrical exterior surface 56 with a radially-projecting mounting flange 58. A central mold cavity 60 is defined in a radial wall section 62 located approximately midway along the length of the receiver 50. The receiver 50 defines the precise location of the longitudinal axis 14 with which the mold cavity 60 is concentric. More significantly in the context of defining the axis 14, the receiver 50 is provided with precision formed, oppositely diverging frustoconical reference surfaces 64 and 66, respectively. Because the only surfaces of the terminal 10 directly shaped by the receiver cavity 60 are the relatively low tolerance exterior surfaces of the ferrule 20 and the flange 16, precision machining in the receiver 50 is concentrated primarily in the frustoconical reference surfaces 64 and 66.

The lens form assembly 52 includes a plunger-like body 68, a lens die pin 70, and an end cap 72. The body 68 is formed with an enlarged end flange 73 at its outboard end and a frustoconical locating surface 74 at the other or inboard end thereof. Critically precision surfaces on the lens form body 68 include the frustoconical locating surface 74 complementing the reference surface 64, peripheral locating and radial end surfaces 76 and 78, respectively, on a circular axially projecting boss 80, and a lens die pin locating bore 82. The end cap 72 is secured to the body 68 releasably by screw bolts 84 (only one shown) and defines a central cavity 86 made concentric with the frustoconical locating surface 64 by the peripheral surface 76 on the boss 80. The central pin locating bore 82 assures precise concentricity of the pin 70 with the frustoconical locating surface 74. An enlarged counterbore 85 extends partially along the length of the pin 70 to facilitate a soldered connection of the pin 70 to the body 68 after final positioning. Removability of the cap 72 is important to facilitate precision machining of the end surface 78 on the boss 80 which defines the radial end face 28 on the terminal 10. Similarly, optical precision is required in the formation of the cylindrical end section 26 of the terminal 10, the mold surfaces for which are defined by the central cavity 86 on the end cap 72. The die pin 70 projects from a cylindrical body 87, the axial position of which is adjustable by the provision of means to be described in more detail below with reference to FIG. 10 of the drawings.

The socket form 54 is an assembly of a plunger-like body 88 having a central socket pin die locating bore 90, a gauge block counterbore 92 and an enlarged end flange 93. A socket pin die 94 projects through the bore 90 so that the terminal end thereof extends within the receiver cavity 60. The body 88 is also formed with a precision machined frustoconical locating surface 96 which complements the reference surface 66 in the receiver 50 in a manner similar to that described above in connection with the lens form assembly 52. The terminal end of the pin 94 is provided with molding die surface formations complementing the bottom of the socket 36 described above with reference to FIG. 5 of the drawings. Like the lens die pin 70, the socket die pin 94 is adjustably positionable axially by means which will be described in more detail below.

The three mold parts 50, 52 and 54 are match machined so that when the three parts are brought together to the position shown in FIG. 6, the axis of the lens die pin 70 and of the socket die pin 94 are concentric within 0.000020 inches. Each set of the three mold parts is appropriately marked as a matched set to assure retention of the critical tolerances originally achieved by match machining. It will be noted that end clearances $C_1$ and $C_2$ are allowed for at the end faces of the end cap 72 and the plunger 88, respectively. While these clearances may result in mold flashing on the flange 16 and the ferrule 20 of the connector terminal 10, slight flashing at these locations is tolerable. In practice, the clearances $C_1$ and $C_2$ may be on the order of 0.0025 inches to 0.0050 inches. Preferably, the clearance $C_1$ is near the lower limit of this range whereas the clearance $C_2$ may be larger.

Also, and as depicted by the double-ended arrows 98 and 99 in FIG. 6, the lens form assembly 52 and the socket form assembly 54 are supported in practice for movement on the axis 14 between a closed position with respect to the receiver 50 and an open position which, though not shown in the drawings, involves a sufficient degree of movement of both the lens form assembly 52 and the socket form assembly 54 so that all parts carried by these two assemblies on the axis 14 will clear the receiver 50 to allow movement of the receiver 50 in a direction perpendicular to the axis 14. Thus, in the closed position of the mold parts, the cavity defining the connector terminal 10 is established whereas in the open condition, the receiver may be moved to a different position for ejection of the molded terminal 10 in a manner which will become apparent from the apparatus to be described.

Figure 7:
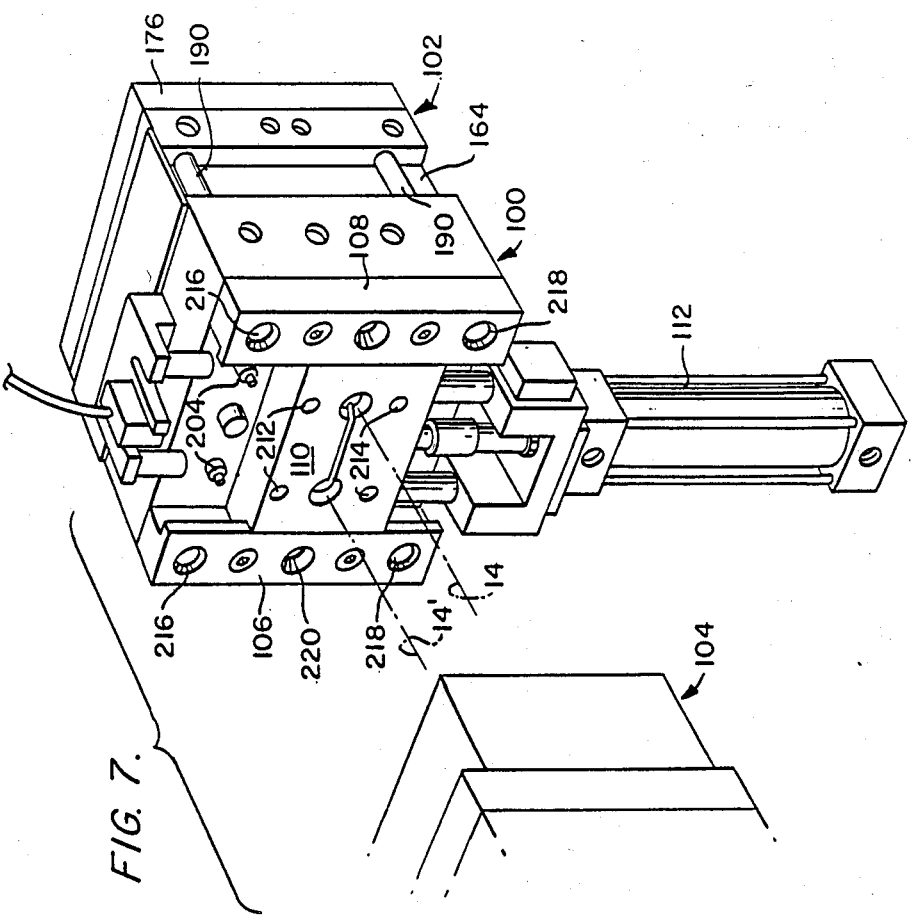
FIG. 7 is an exploded perspective view illustrating the molding apparatus of the invention in one condition of operation.
Figure 11:
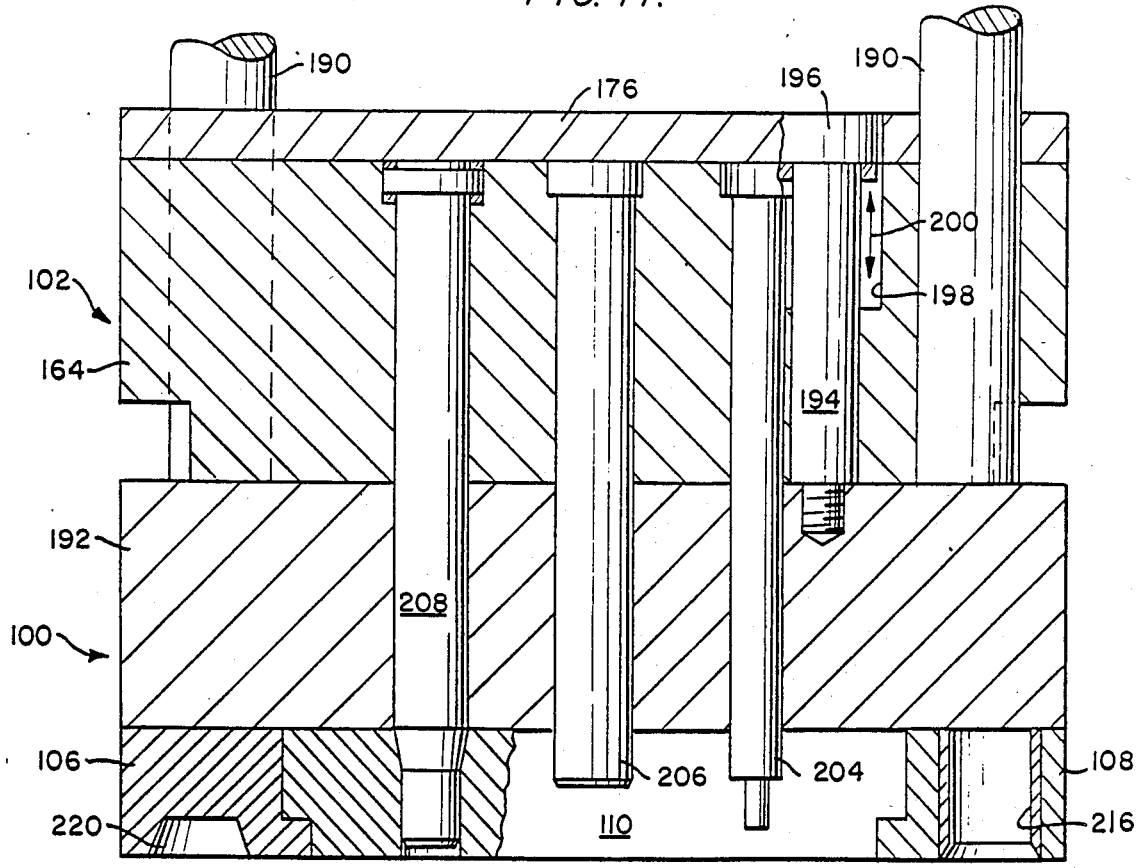
FIG. 11 is a cross section on line 11—11 of FIG. 9.

The general organization of apparatus for supporting and using the mold parts 50, 52 and 54 is shown in FIGS. 7 and 8 to include a central frame 100, a reciprocal rear frame 102 and a retractable front frame 104. The central frame 100 is provided on its front face, which is visible in FIGS. 7, 8 and 9, with a pair of fixed guideways 106 and 108 to support a shuttle 110 for movement between a lower molding position shown in FIG. 7 and an upper ejection position as shown in FIG. 8. A reversible piston/cylinder unit 112 is supported from the central frame for advancing the shuttle 110 between the two positions thus depicted respectively in FIGS. 7 and 8. A more complete understanding of the frames 100, 102 and 103, as well as the structure and operation thereof in relation to the mold parts 50, 52 and 54, will be facilitated by reference to FIGS. 9-11 in addition to FIGS. 7 and 8.

Figure 9:
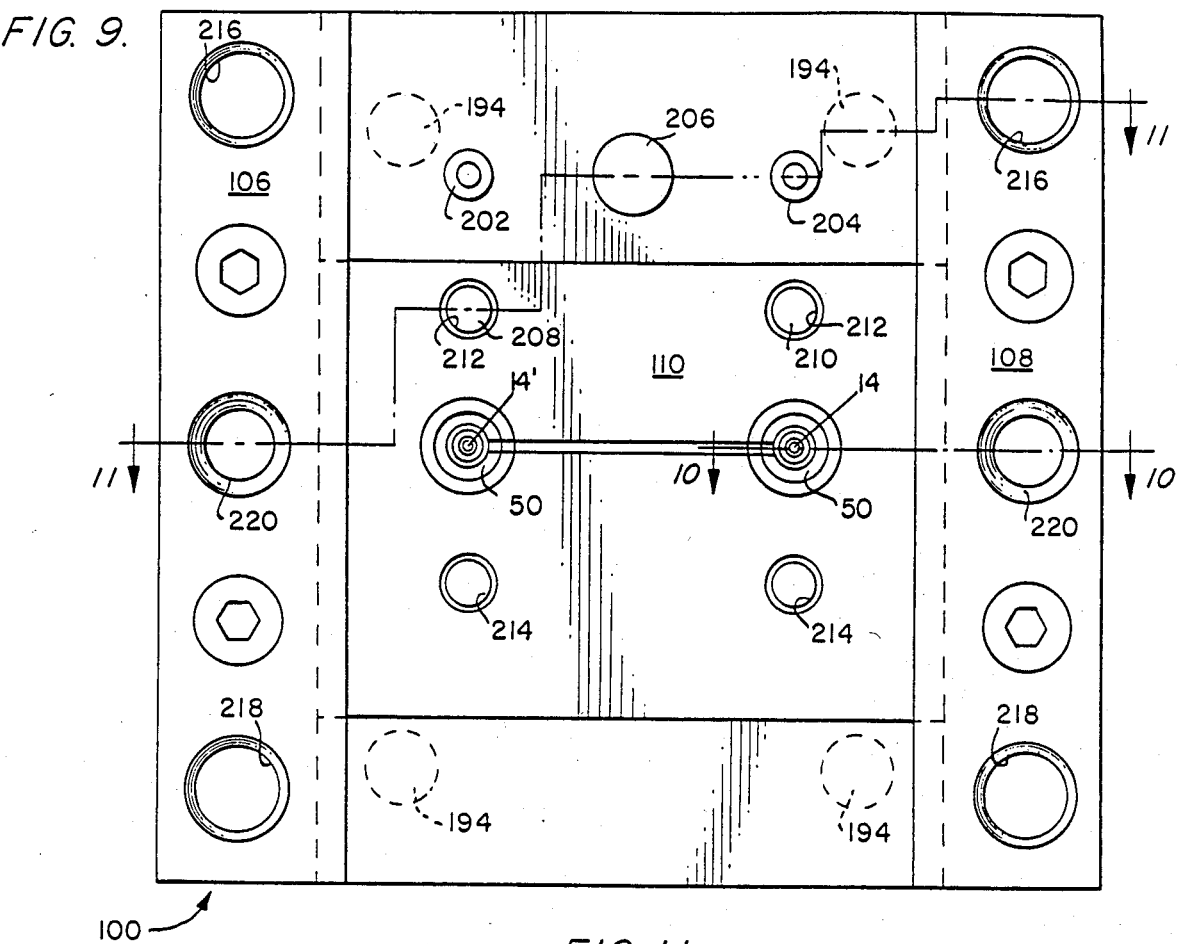
FIG. 9 is a front elevation of a central molding assembly of the present invention.

It will be noted in FIGS. 7 and 9 of the drawings that the overall apparatus defines two molding axes 14 and 14'. The plane defined by these parallel axes 14 and 14' is, moreover, a horizontal plane containing the longitudinal center line of the three frames 100, 102 and 104. Also, the frames carry a full complement of working components on each of the two axes including a full set of the three mold part assemblies described above with reference to FIG. 6.

Figure 10:
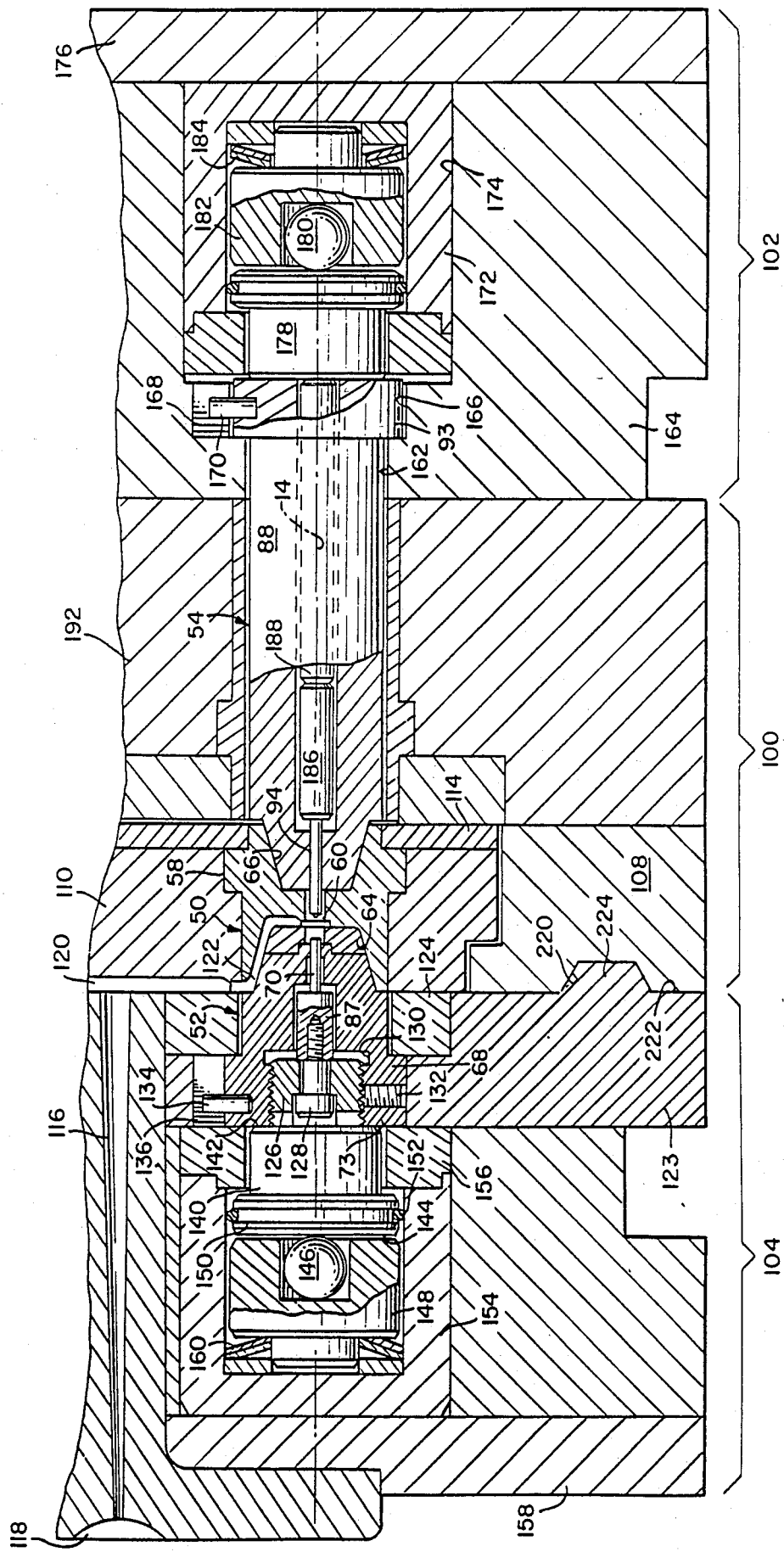
FIG. 10 is a longitudinal cross section on line 10—10 on FIG. 9 and thoughout the full length of the apparatus.

In FIG. 10 of the drawings, a longitudinal cross section throughout the three frame members 100, 102 and 104 on the plane containing the two axes 14 and 14' is partially illustrated to show all components on the axis 14, such components being duplicated in practice on the axis 14'. Thus, in FIG. 10, the receiver 50 is shown supported in the shuttle 110 and retained in place by a shuttle backplate 114 in abutment with the mounting flange 58 on the receiver 50. In the section illustrated in FIG. 10, the passageway for introducing plastic material under injection pressures into the mold cavity 60 is illustrated as including a central sprue 116 extending from a concavity 118 at the outboard end face of the front frame 104 to a shuttle runner 120 in communication with a receiver runner 122 which opens to the mold cavity 60, specifically at the flat 22 on the circular flange 16 of the connector terminal 10 to be formed. The opening of the receiver runner 122 into the cavity 60 thus constitutes the only non-molding portion of internal surfaces defined by the cavity 60.

The lens form assembly 52 is shown in FIG. 10 to be carried by the front frame 104. In particular, the body 68 of the assembly 52 is located in a face plate 123 and secured by an apertured inset plate 124 positioned to be in abutment with the end flange 73. Also, in FIG. 10, the assembly 52 is shown more completely than in FIG. 6 as described above. In particular, the cylindrical mounting body 87, from which the lens die pin 70 projects, is captured by abutment against the face of a micrometer screw 126 under force developed by a screw bolt 128. The micrometer screw 126 is threadably received within an internally threaded end bore 130 in the plunger body 68 and is capable of being secured in a finally adjusted position by a set screw 132. A dowel pin 134 rides in an axial slot 136 in the faceplate 123 forming part of the front frame 104 to retain the angular orientation of the assembly 52. This arrangement enables adjustment of the precise axial position of the pin 70 relative to the body 68 and, in particular, the conical locating surface 74 thereon. Once the position is established using the micrometer screw 126, the location of the pin is secured by soldering, given the facility of the counterbore 85 described above with reference to FIG. 6. It is contemplated that a system of abutment gauge blocks and shims may be used with equal or greater accuracy to axially position the lens die pin 70 in the body 68.

Situated behind the lens form assembly 52 in the context of its movement toward the closed position in the receiver 50, is a drive plunger 140 in abutment at an inboard end 142 with the body 68 and engaged at its other or outboard end 144 exclusively by a ball 146 positioned on the axis 14 by a spring plunger 148. The drive plunger 140 is formed with a head 150 at its outboard end adapted to mount an O-ring 152. The head 150 of the drive plunger 140 and the spring plunger 148 are slidably received within a cup-like receptacle 154 to be retained therein by an annular cap 156 through which the body of the drive plunger 140 projects. The receptacle is captured in the front frame member 104 between the face plate 123 thereof and an outboard end plate 158.

Included in the receptacle 154 and effective between the bottom or outboard end thereof and the spring plunger 148 is a Belleville spring washer set 160. The spring washer 160 imposes an axial bias through the spring plunger 148, the ball 146, the drive plunger 140 to the body 68 of the lens form assembly 52 so that these parts are seized axially between the spring washer 160 and the inset plate 124 of the front frame member 104. More importantly, the spring washer set 160 functions to limit the axial force by which the frustoconical reference surfaces on the assembly 52 may be advanced against the frustoconical abutment surface 64 on the receiver 50 as the frame member 104 is moved against the central frame 100. Also, in this connection, it will be noted that each of the plunger-like body 68 of the lens form assembly 52, the drive plunger 140, and the spring plunger 148 are supported in the frame 104 with radial clearance in a manner such that the axial location of the lens form assembly 52 is not affected in any way by precise axial alignment of the frame 104 with the axis 14, the location and orientation of which is established exclusively by the receiver 50. Moreover, and because of the force transmitted solely by the ball 146, movement of the locating surface 74 on the lens form assembly 52 into the frustoconical reference surface 64 of the receiver 50 is exclusively under an axial closing force limited in its magnitude by the Belleville washer set 160.

The socket form assembly 54 is carried by the rear frame 102 in a manner substantially the same as the lens form assembly 52 is carried by the front frame 104. In this instance, the body 88 of the assembly 54 projects through a bore 162 in a body plate 164 of the frame 102 with the end flange 93 of the body 88 in abutment with the base of a first counterbore 166 having a radial slot 168 to receive a dowel pin 170 to maintain the angular orientation of the assembly 54 on the axis 14. A cup-like receptacle 172, identical to the receptacle 154, is received in a second counterbore 174 closed by an outboard end plate 176 forming part of the rear frame 102. A drive plunger 178, a ball 180, a spring plunger 182 and a Belleville washer set 184 are contained within the receptacle 172 in the same manner as the corresponding components are supported in the receptacle 152. Also, the body 88, plunger 178, and spring plunger 182 are again supported with radial clearance so that forces ultimately advancing the frustoconical locating surface 96 at the inboard end of the body 88 are isolated exclusively to axial forces transmitted by the Belleville washer spring set 184 and the ball 180.

The socket die pin 94, like the lens die pin 70, projects from a cylindrical body 186 received in the counterbore 92. Axial positioning of the socket die pin 94 is established by a cylindrical gauge block 188 extending between the outboard end of the cylindrical body 186 and the inboard end or face of the drive plunger 178. Such an arrangement facilitates the use of shims or precisely dimensioned gauge blocks of varying specific lengths to enable accurate axial positioning of the socket die pin 94 in relation to the locating surface 96 on the body 88. As in the case of the lens die pin 70, the socket die pin 94 may be soldered to the body 88 once its precise final position has been established.

As shown in FIGS. 7-9 and 11 of the drawings, the rear frame 102 is supported from the central frame 100 by four guide rods 190 anchored in a bed plate 192 of the central frame 100. As depicted in FIGS. 7 and 8, the rear frame 102 is reciprocable on the guide rods 190 between an advanced working position as shown in FIG. 7 and a retracted position shown in FIG. 8. The advanced working position is established by abutment of the inboard face of the body plate 164 with the rear face of the bed plate 192 on the central frame 100. The retracted position is established by four shoulder bolts 194 secured in the bed plate 192, each having a head 196 operative in a counterbore 198 to allow movement represented by the double-ended arrow 200 in FIG. 11.

In addition to carrying the socket form assembly 54, the rear frame 102 supports a plurality of locating and ejection pins for cooperation with the shuttle 110 both in its molding position as shown in FIG. 7 and in its ejection position as shown in FIG. 8. Specifically, a pair of part ejection pins 202 and 204 are supported from the rear frame 102 in a position to project into the receiver mold cavity 60 to eject the part 10 from the receiver 50 when the shuttle 110 is positioned in its upper position. A sprue ejection pin 206 is similarly supported from the rear frame 102.

The final positioning of the shuttle 110 in both the molding position and in the elevated ejection position is effected by a pair of locator pins 208 and 210 adapted to project into one of two pairs of vertically spaced locator bores 212 and 214 in the shuttle 110. The center-to-center spacing of the pairs of bores 212 and 214 is equal to the distance of shuttle travel between the molding position of FIG. 7 and the ejection position of FIG. 8. Thus, extension of the locator pins 208 into the bores 212 establishes the molding position of the shuttle 110 whereas projection of the pins 208 into the bores 214 establishes the ejection position of the shuttle 110.

Although the support of the front frame 104 is not shown in the drawing, in practice, the front frame 104 is supported for axial movement against the front face of the center frame 100. The front face of the guide rails 106 and 108 are each provided with two essentially cylindrical sockets 216 and 218 as well as with a frustoconical pocket 220. Complementary projections on the inboard face 222 of the front frame 104 engage in the recesses 216, 218 and 220 to establish the final position of the front frame 104 against the center frame 100. Although the projections on the front face which engage the cylindrical recesses 216 and 218 are not shown in the drawings, one of the frustoconical recesses 220 is shown in FIG. 10 together with a complementing projection 224 on the front frame 104.

In operation of the molding apparatus thus described, with the shuttle 110 in the lower molding position as represented in FIG. 7, the front and rear frames 104 and 102, respectively, are advanced against the central frame 100 to be guided into their operative position by the respective guide rails, locator pins and projections described. As a result of force exerted on the outboard plates 158 and 176, each of the Belleville washer sets 160 and 184 is stressed to place a predetermined axial load on the lens form assembly 52 and the socket form assembly 54 so that the frustoconical locating surfaces 64 and 96 on these assemblies seat in the complementing frustoconical reference surfaces 64 and 66, respectively, formed in the receiver 50. As a result of this forcible movement of the front and rear frames, two mold cavities in the shuttle 110 will be closed. Plastic material is then injected into the sprue 116 through the runners 120 and 122 to the mold cavities 60 under injection molding pressures.

After the injected plastic has solidified sufficiently, the front and rear frames are retracted away from the shuttle 110, and the piston/cylinder unit 112 actuated to move the shuttle upwardly to the injection position shown in FIG. 8. Thereafter, the rear frame 102 is advanced again toward the central frame 100 so that the ejection pins 204 and 206 engage the rear of the mold cavity 60 as well as portions of plastic formed by the sprue 116 and the runners 120 and 122. Thereafter, the rear frame 102 is again retracted, the shuttle 110 lowered, and the cycle repeated.

Thus, it will be appreciated that as a result of the present invention, an extremely effective precision molding apparatus and method is provided by which the principal objective, among others, is completely fulfilled. It will be equally appreciated by those skilled in the art and is contemplated that modifications and/or changes may be made in the embodiment illustrated and described herein without departure from the present invention. Accordingly, it is expressly intended that the foregoing description and accompanying drawings are illustrative only, not limiting, and that the true spirit and scope of the present invention be determined by reference to the appended claims.

What is claimed is:

1. A method for forming a cavity for injection molding of precision optical components such as a fiber optics connector terminal part having a longitudinal axis, a lens surface concentric with said axis and an optical fiber end locating socket formation also concentric with said axis and located thereon to be at the focal point of said lens surface, said method comprising the steps of:

fixing a central receiver on said axis, said receiver having a central mold cavity forming portion for defining low tolerance exterior surfaces of said part and having oppositely diverging frustoconical reference surfaces concentric with said axis;

supporting lens form and socket form assemblies for movement generally along said axis between closed and retracted positions relative to said central receiver but with freedom of movement radially of aid axis, each of said asemblies having a frustoconical locating surface to complement one or the other of said frustoconical reference surfaces of said central receiver cavity forming portion and in cooperation therewith to define said connector terminal part cavity and an axially positionable pin die concentric with said locator surface for forming the lens surface and the socket formation respectively; and advancing said assemblies from said open position to said closed position by application of force exclusively along said axis so that all of said frustoconical locating surfaces slidably engage with one another with freedom of motion radially to prevent wearing thereof as said assemblies advance into said closed position to form said connector terminal part cavity.

2. The method recited in claim 1, including the step of retracting said form assemblies from said receiver to facilitate ejector of part from said central mold cavity.

3. The method recited in claim 2, including the step of moving said receiver to an ejection position for the performance of ejection of a part.

* * * * *